(12) United States Patent
Uchida et al.

(10) Patent No.: US 7,572,505 B2
(45) Date of Patent: Aug. 11, 2009

(54) BLACK MAGNETIC IRON OXIDE PARTICLES HAVING HIGH BREAKDOWN VOLTAGE

(75) Inventors: Naoki Uchida, Ohtake (JP); Ryo Iwai, Ohtake (JP); Mamoru Kamigaki, Ohtake (JP); Shinji Uemoto, Ohtake (JP); Koso Aoki, Ohtake (JP); Hiromitsu Misawa, Ohtake (JP)

(73) Assignee: Toda Kogyo Corporation, Hiroshima-shi, Hiroshima-ken (JP)

( * ) Notice: Subject to any disclaimer, the term of this patent is extended or adjusted under 35 U.S.C. 154(b) by 0 days.

(21) Appl. No.: 11/785,737

(22) Filed: Apr. 19, 2007

(65) Prior Publication Data

US 2007/0254157 A1 Nov. 1, 2007

(30) Foreign Application Priority Data

Apr. 28, 2006 (JP) .............................. 2006-126173

(51) Int. Cl.
*B32B 5/16* (2006.01)
(52) U.S. Cl. ........................ 428/403; 428/329; 428/699; 428/701; 428/900
(58) Field of Classification Search ................. 428/403, 428/329, 699, 701, 900
See application file for complete search history.

(56) References Cited

U.S. PATENT DOCUMENTS

| | | | |
|---|---|---|---|
| 4,990,189 A | | 2/1991 | Wiese et al. |
| 5,449,565 A | * | 9/1995 | Aoki et al. ................ 428/842.6 |
| 5,578,375 A | * | 11/1996 | Okano et al. ................ 428/402 |
| 5,652,060 A | * | 7/1997 | Uchida et al. ................ 428/404 |
| 5,858,532 A | * | 1/1999 | Kozawa et al. ............... 428/402 |
| 6,251,555 B1 | * | 6/2001 | Hayashi et al. ........... 430/106.2 |
| 6,383,637 B1 | * | 5/2002 | Misawa et al. .............. 428/403 |
| 6,416,864 B1 | * | 7/2002 | Hayashi et al. .............. 428/403 |
| 6,780,555 B2 | * | 8/2004 | Uchida et al. ............ 430/106.2 |
| 6,844,067 B2 | * | 1/2005 | Shimo et al. ................. 428/402 |
| 7,144,626 B2 | * | 12/2006 | Akai et al. ................... 428/402 |
| 7,147,796 B2 | * | 12/2006 | Shimamura et al. ....... 252/62.56 |
| 2002/0168523 A1 | | 11/2002 | Uchida et al. |
| 2005/0069705 A1 | | 3/2005 | Shimamura et al. |

FOREIGN PATENT DOCUMENTS

| | | |
|---|---|---|
| EP | 0 350 625 A | 1/1990 |
| EP | 1 225 600 A | 7/2002 |
| EP | 1 443 024 A | 8/2004 |
| JP | 07 335417 A | 12/1995 |
| JP | 2000 335920 A | 12/2000 |

* cited by examiner

*Primary Examiner*—H. (Holly) T Le
(74) *Attorney, Agent, or Firm*—Nixon & Vanderhye P.C.

(57) ABSTRACT

The present invention relates to black magnetic iron oxide particles comprising core particles and a surface layer formed on a surface of the respective core particles which is made of a compound of at least one alkali earth metal element selected from the group consisting of Mg, Ca, Sr and Ba and an aluminum element, in which a content of the at least one alkali earth metal element present in the surface layer is from 100 ppm to 1000 ppm on the basis of a whole weight of the black magnetic iron oxide particles; a content of the aluminum element present in the surface layer is from 1000 ppm to 20000 ppm on the basis of a whole weight of the black magnetic iron oxide particles; a ratio [A/B] of the content [A (ppm)] of the aluminum element to the content [B (ppm)] of the at least one alkali earth metal element present in the surface layer is from 1 to 100; and a molded product comprising said black magnetic iron oxide particles has a breakdown voltage of not less than 400 V/cm.

5 Claims, No Drawings

BLACK MAGNETIC IRON OXIDE PARTICLES HAVING HIGH BREAKDOWN VOLTAGE

BACKGROUND OF THE INVENTION

The present invention relates to black magnetic iron oxide particles which are suitably used as black coloring pigments for paints, resins, printing inks, etc., because of a good blackness thereof, and as magnetic materials for binder-type carriers, and more particularly to black magnetic iron oxide particles which are capable of providing toners having a high image density even under high-temperature and high-humidity conditions, an improved keeping property of the image density and a less occurrence of fogging even under low-temperature and low-humidity conditions when used as black magnetic particles for magnetic toners.

Magnetite particles ("particles" are also occasionally referred to as a "particulate powder" in view of a shape or configuration thereof) are typical black pigments, and have been generally used for a long time as a colorant for paints, printing inks, cosmetics, rubber and resin compositions, etc.

In particular, the magnetite particles have been frequently used in one-component type magnetic toners in which composite particles prepared by mixing and dispersing black magnetic iron oxide particles such as magnetite particles in resins are employed as a developer.

In recent years, with the tendency of a high printing speed and a high image quality for laser beam printers or digital copying machines as well as the development of apparatuses capable of being operated under various environmental conditions, it has been strongly required to enhance properties of magnetic toners as a developer, in particular, provide toners capable of exhibiting a good keeping property of image density even under not only low-temperature and low-humidity conditions but also high-temperature and high-humidity conditions and a less occurrence of fogging.

In order to meet the above requirements for the magnetic toners, it is also strongly required that the black magnetic iron oxide particles used therein are further improved in properties thereof.

More specifically, in order to obtain toners which are excellent in environmental stability, in particular, keeping property of image density under high-temperature and high-humidity conditions, the black magnetic iron oxide particles used therein are required to have not only a sufficient resistance value as well as more excellent electric properties such as a high breakdown voltage, but also excellent environmental stability of these properties.

The reason therefor is due to the fact that upon forming a toner image, an image force as a resultant force of an electrostatic attraction force and a magnetic constraint force is exerted on toner particles when the toner particles fly towards a latent image formed on a photosensitive member, and an intensity of the image force is delicately controlled to attain a good balance between image density and fogging.

Namely, the toner particles having a high resistance value are improved in charging performance and, therefore, tend to readily fly towards the photosensitive member, resulting in a high image density. However, when the charging performance of the toner particles is too high, fogging tends to be caused. On the other hand, when the charging performance of the toner particles is too low, the fogging tends to be hardly caused, but it may be difficult to attain a sufficient image density.

In order to control the charging performance of the toner particles, there may be usually used a charge controlling agent. As the other means for controlling the charging performance of the toner particles, there is known the method of controlling an electric resistance value of magnetic iron oxide particles as a pigment component exposed to the surface of the respective toner particles. More specifically, when the electric resistance value of the magnetic iron oxide particles exposed to the surface of the respective toner particles is high, the toner particles tend to be readily charged. On the contrary, when the electric resistance value of the magnetic iron oxide particles exposed to the surface of the respective toner particles is low, an electrostatic charge on the surface of the charged toner particles is leaked through the magnetic iron oxide particles exposed to the surface of the respective toner particles upon stirring in a toner hopper, resulting in decreased charge amount of the toner particles.

These phenomena tend to become more remarkable under some environmental atmospheres to which the developing device is exposed, in particular, under high-temperature and high-humidity conditions or under low-temperature and low-humidity conditions. More specifically, in general, the charging performance of the toner tends to be lowered under high-temperature and high-humidity conditions, resulting in low image density, whereas the charging performance of the toner tends to be too high under low-temperature and low-humidity conditions, resulting in occurrence of fogging.

Therefore, when the black magnetic iron oxide particles are used as a pigment for the toner particles, well-controlled electric characteristics of the black magnetic iron oxide particles are very important to obtain images having a high image density without occurrence of fogging.

As to the electric resistance value of the black magnetic iron oxide particles, it is generally known that since magnetite exhibits electric characteristics of a semiconductor, a high electric resistance value thereof is realized by coating or attaching a high-resistance component (such as high-resistance oxides, hydroxides, dielectric organic substances, hydrophobic organic substances, etc.) on the surface of the respective black magnetic iron oxide particles by a dry or wet method.

Conventionally, it has been attempted to improve various properties of the black magnetic iron oxide particles by incorporating different kinds of elements other than iron thereinto and coating the surface thereof with an inorganic or organic substance.

For example, in Japanese Patent Application Laid-open (KOKAI) No. 5-213620(1993), there is described black magnetic iron oxide exhibiting a high electric resistance value by allowing a Si component to be contained therein or exposed onto the surface thereof. Also, in Japanese Patent Application Laid-open (KOKAI) No. 8-208236(1996), there is described black magnetic iron oxide coated with an oxide layer containing Fe and Zn.

Further, in Japanese Patent Application Laid-open (KOKAI) No. 2000-272924, there is described black magnetic iron oxide exhibiting a high electric resistance value which is coated with a hydrophobilizing agent.

Further, in Japanese Patent Application Laid-open (KOKAI) No. 2003-192350, there is described black magnetic iron oxide coated with a composite oxide layer containing an aluminum component and a magnesium component.

In addition, in Japanese Patent Application Laid-open (KOKAI) No. 2004-161551, there is described black magnetic iron oxide coated with a composite oxide layer containing Ti and Fe.

At present, it has been strongly required to provide black magnetic iron oxide particles exhibiting a high electric resistance in a high voltage range. However, the conventional black magnetic iron oxide particles have failed to satisfy these requirements.

That is, in the conventional techniques described in Japanese Patent Application Laid-open (KOKAI) Nos. 5-213620 (1993), 8-208236(1996), 2000-272924, 2003-192350 and 2004-161551, the electric resistance value of the particles has been noticed, and studies on the electric resistance value of the particles have been made mainly in a low voltage range. However, the voltage of an electric field applied to the toner particles within a printer in which the toner particles are actually used, generally reaches the range of several hundred volts though it varies depending upon the kind of printer used.

In order to achieve a high image density and a good keeping property of the high image density, it is important that a pigment used in the toner exhibits a high electric resistance value, and the electric resistance value of the pigment is also kept high even in a high voltage range. More specifically, even though the pigment exhibits a high electric resistance value in a low voltage range, if the electric resistance value is low in an electric field actually used, an electrostatic charge present on the surface of the toner tends to leak out through the pigment exposed to the surface of the toner as a leak site, resulting in low charge amount on the toner and, therefore, considerable deterioration in image density.

Thus, all of the conventional techniques described in Japanese Patent Application Laid-open (KOKAI) Nos. 5-213620 (1993), 8-208236(1996), 2000-272924, 2003-192350 and 2004-161551 are concerned with enhancement in electric resistance value in a low voltage range, and have therefore failed to satisfy the requirement of enhancing the electric resistance value in a high voltage range which has been strongly needed at the present time.

SUMMARY OF THE INVENTION

The object of the present invention is to provide a black magnetic iron oxide pigment capable of forming a toner which exhibits a high image density under high-temperature and high-humidity conditions, is improved in keeping property of the image density, and is inhibited from suffering from occurrence of fogging even under low-temperature and low-humidity conditions.

As a result of the present inventors' earnest study in view of the above technical problems, it has been found that the black magnetic iron oxide particles whose surface is coated with a specific amount of a surface layer containing specific elements can exhibit a high electric resistance value even in a high voltage range.

To attain the aims, in an aspect of the present invention, there is provided black magnetic iron oxide particles comprising core particles and a surface layer formed on a surface of the respective core particles which is made of a compound of at least one alkali earth metal element selected from the group consisting of Mg, Ca, Sr and Ba and an aluminum element, in which a content of the at least one alkali earth metal element present in the surface layer is from 100 ppm to 1000 ppm on the basis of a whole weight of the black magnetic iron oxide particles; a content of the aluminum element present in the surface layer is from 1000 ppm to 20000 ppm on the basis of a whole weight of the black magnetic iron oxide particles; a ratio [A/B] of the content [A (ppm)] of the aluminum element to the content [B (ppm)] of the at least one alkali earth metal element present in the surface layer is from 1 to 100; and a molded product comprising said black magnetic iron oxide particles has a breakdown voltage of not less than 400 V/cm.

In a preferred embodiment of the above aspect, when the black magnetic iron oxide particles are mixed in a 0.002 N HCl aqueous solution at 40° C. under stirring for 10 min, an amount of aluminum eluted from the black magnetic iron oxide particles (amount of weak acid-soluble aluminum) is not more than 500 ppm on the basis of a weight of the black magnetic iron oxide particles.

In the other preferred embodiment of the above aspect, a molded product formed from the black magnetic iron oxide particles which has a density of 2.7 g/cm$^3$ exhibits an electric resistance of not less than 1×10$^6$ Ωcm when applying a D.C. voltage of 500 V thereto.

In the other preferred embodiment of the above aspect, the black magnetic iron oxide particles have an average particle diameter of 0.10 to 0.30 μm and a BET specific surface area of 4 to 20 m$^2$/g, and a product α of the average particle diameter and the BET specific surface area which is represented by the following formula is from 1.2 to 2.0 (1.2 ≦α≦2.0).

α=BET specific surface area (m$^2$/g)×average particle diameter (μm)

DETAILED DESCRIPTION OF THE INVENTION

The present invention is described in detail below. Meanwhile, in the present invention, since it is sometimes required that properties of the black magnetic iron oxide particles are defined as those of a molded product comprising the black magnetic iron oxide particles, the molded product comprising the black magnetic iron oxide particles are hereinafter occasionally referred to as a "molded product".

The particle shape of the black magnetic iron oxide particles according to the present invention is not particularly limited. The black magnetic iron oxide particles may have a hexahedral shape, an octahedral shape, a polyhedral shape, a granular shape, a spherical shape, etc.

The black magnetic iron oxide particles of the present invention comprise core particles and a surface layer formed on the respective core particles. The "surface layer" means a portion of the respective magnetic iron oxide particles except for an Fe-containing portion which extends from a center of each particle toward the surface thereof. Also, the "core particles" mean an inside portion of the respective black magnetic iron oxide particles except for the surface layer.

The surface layer of the respective black magnetic iron oxide particles according to the present invention is a layer formed by uniformly dispersing a compound of at least one alkali earth element selected from the group consisting of Mg, Ca, Sr and Ba and an aluminum element over the surface of the respective core particles.

In the black magnetic iron oxide particles of the present invention, the content of the aluminum element present in the surface layer of the respective black magnetic iron oxide particles is not less than 1000 ppm and not more than 20000 ppm on the basis of a whole weight of the black magnetic iron oxide particles. When the content of the aluminum element present in the surface layer is less than 1000 ppm, the resultant black magnetic iron oxide particles tend to exhibit not only a low electric resistance value but also a low breakdown voltage. When the content of the aluminum element present in the surface layer is more than 20000 ppm, the resultant black magnetic iron oxide particles tend to not only exhibit a high moisture absorption but also be lowered in both electric resistance value and breakdown voltage. The content of the aluminum element present in the surface layer is preferably 1000 to 18000 ppm and more preferably 1000 to 15000 ppm. Meanwhile, in the present invention, all of the "ppm" values represent "ppm by weight".

In the black magnetic iron oxide particles of the present invention, the content of the at least one alkali earth metal element selected from the group consisting of Mg, Ca, Sr and Ba which is present in the surface layer of the respective black magnetic iron oxide particles is not less than 100 ppm and not more than 1000 ppm on the basis of a whole weight of the black magnetic iron oxide particles. When the content of the at least one alkali earth metal element present in the surface layer is less than 100 ppm, the resultant black magnetic iron oxide particles may fail to exhibit a breakdown voltage of not less than 400 V/cm. When the content of the at least one alkali earth metal element present in the surface layer is more than 1000 ppm, the surface of the resultant black magnetic iron oxide particles tends to show a moisture absorption, resulting in not only low electric resistance value and low breakdown voltage of the obtained particles but also strong interaction with a resin component in a toner composition and, therefore, deterioration in mixing property and dispersibility therein. The content of the at least one alkali earth metal element present in the surface layer of the respective black magnetic iron oxide particles is preferably 120 to 990 ppm and more preferably 130 to 980 ppm.

The ratio [A/B] of the content [A (ppm)] of the aluminum element present in the surface layer of the respective black magnetic iron oxide particles to the content [B (ppm)] of the at least one alkali earth metal element selected from the group consisting of Mg, Ca, Sr and Ba which is in the surface layer, is not less than 1.0 and not more than 100. When the ratio [A/B] of the content [A (ppm)] of the aluminum element to the content [B (ppm)] of the at least one alkali earth metal element selected from the group consisting of Mg, Ca, Sr and Ba is less than 1.0, the resultant black magnetic iron oxide particles exhibit a relatively high electric resistance value in a low voltage range, but tends to have a low electric resistance value in a high voltage range. When the ratio [A/B] is more than 100, the resultant black magnetic iron oxide particles tend to have a high moisture absorption, resulting in low electric resistance value in a high voltage range. The ratio [A/B] of the content [A (ppm)] of the aluminum element to the content [B (ppm)] of the at least one alkali earth metal element selected from the group consisting of Mg, Ca, Sr and Ba is preferably 1.0 to 90 and more preferably 1.0 to 80.

The molded product comprising the black magnetic iron oxide particles of the present invention has a breakdown voltage of not less than 400 V/cm. When the breakdown voltage of the molded product is less than 400 V/cm, the resultant black magnetic iron oxide particles may fail to exhibit a high electric resistance value in a high voltage range. The breakdown voltage of the molded product comprising the black magnetic iron oxide particles is preferably not less than 500 V/cm and more preferably not less than 600 V/cm. As to the upper limit of the breakdown voltage of the molded product comprising the black magnetic iron oxide particles, since a maximum voltage applied by a measuring apparatus used in the present invention was 1000 V, the upper limit of the breakdown voltage measured was substantially about 1.8 kV/cm.

In the black magnetic iron oxide particles of the present invention, an amount of Al eluted out therefrom (amount of weak acid-soluble Al) is preferably not more than 500 ppm when measured by mixing the black magnetic iron oxide particles in a 0.002 N HCl aqueous solution at 40° C. under stirring for 10 min. When the amount of weak acid-soluble Al contained in the black magnetic iron oxide particles is more than 500 ppm, the resultant black magnetic iron oxide particles tend to be lowered in electric resistance value and breakdown voltage. The reason therefor is that since the surface layer formed on the respective core particles which is made of the alkali earth metal element and the Al element becomes uneven under the above condition, the Al element contained in the surface layer tends to be readily eluted out from the surface layer when exposed to a weak acid aqueous solution. Further, owing to the uneven surface treatment, a thinner surface layer portion or a surface-untreated portion tends to exist on the core particles, and an electric current tends to leak through such a portion, resulting in low electric resistance value and low breakdown voltage of the obtained black magnetic iron oxide particles. The amount of the weak acid-soluble Al contained in the surface layer is more preferably not more than 450 ppm and still more preferably not more than 400 ppm.

The molded product having a density of 2.7 g/cm$^3$ which is formed from the black magnetic iron oxide particles of the present invention exhibits an electric resistance of preferably not less than $1 \times 10^6$ Ωcm and more preferably not less than $1 \times 10^7$ Ωcm when applying a D.C. voltage of 500 V thereto. Incidentally, the above density of 2.7 g/cm$^3$ is a substantial value in the practical measurement, it may be understand that the molded product having a density of within 2.5 to 2.8 g/cm$^3$ which is formed from the black magnetic iron oxide particles of the present invention exhibits an electric resistance of preferably not less than $1 \times 10^6$ Ωcm and more preferably not less than $1 \times 10^7$ Ωcm when applying a D.C. voltage of 500 V thereto. If the density is extremely out of the range of 2.5 to 2.8 g/cm$^3$, the electric resistance is changed and it may be difficult to compare respective measured values.

The black magnetic iron oxide particles of the present invention preferably have an average particle diameter of 0.10 to 0.30 μm. When the average particle diameter of the black magnetic iron oxide particles is less than 0.10 μm, it may be difficult to well disperse the obtained black pigment in toner particles when used in a toner. When the average particle diameter of the black magnetic iron oxide particles is more than 0.30 μm, the number of magnetic particles contained in the toner particles tends to be comparatively reduced, resulting in poor tinting strength.

The black magnetic iron oxide particles of the present invention preferably have a BET specific surface area of 4 to 20 m$^2$/g. When the BET specific surface area of the black magnetic iron oxide particles is less than 4 m$^2$/g, the BET specific surface area is smaller than the theoretical calculated value so that there is a possibility that particles are coagulated each other and these are present as coarse particles having larger size than each particle size. Therefore, this is not preferable in view of dispersibility thereof. When the BET specific surface area of the black magnetic iron oxide particles is more than 20 m$^2$/g, the resultant black magnetic iron oxide particles tend to exhibit a high moisture absorption, resulting in deterioration of image density.

In the black magnetic iron oxide particles of the present invention, a product α of the BET specific surface area and the average particle diameter thereof which is represented by the formula is preferably 1.2 to 2.0 and more preferably 1.3 to 1.9.

$\alpha = $(BET specific surface area (m$^2$/g))×(average particle diameter (μm)), When the product α is more than 2.0, the BET specific surface area value of the black magnetic iron oxide particles becomes increased if the average particle diameters thereof are the same, so that the obtained black magnetic iron oxide particles tend to exhibit a high moisture absorption, resulting in low electric resistance value and low breakdown voltage. The large BET specific surface area value of the black magnetic iron oxide particles having a product α of more than 2.0 tends to be caused by such a condition that the compound of the alkali earth metal element and the Al element to be present on the surface of the respective core particles fails to be uniformly surface-treated thereon, or tends to be deposited on portions other than the surface of the respective core particles, i.e., separately from the magnetic particles. When the product α is 1.2, the black magnetic iron oxide particles have a minimum BET specific surface area value assuming that the particles have a spherical shape. This means that the most uniform and smoothest surface layer is formed on the respective core particles. In the above specified range of the average particle diameter, it is theoretically impossible to obtain the particles having a BET specific surface area value lower than the minimum value.

Meanwhile, in the core particles of the black magnetic iron oxide particles according to the present invention, in order to improve various properties as required upon use, various elements may be contained in a whole portion or specific portions within the core particles. However, if Al is contained in the core particles, for the same reason as described above, the amount of Al eluted out from the black magnetic iron oxide particles finally produced after the surface treatment, namely, the amount of the weak acid-soluble Al contained therein, is preferably not more than 500 ppm on the basis of the weight of the black magnetic iron oxide particles.

Next, the process for producing the black magnetic iron oxide particles according to the present invention is described.

The black magnetic iron oxide particles of the present invention may be produced by forming the core particles made of magnetite by an ordinary method, adding an aluminum salt and an alkali earth metal salt to a slurry containing the core particles, and then controlling a pH value of the resultant slurry under heating.

As described above, the core particles used for obtaining the black magnetic iron oxide particles of the present invention may be selected from those particles having various shapes and particle diameters from the standpoints of magnetic properties, dispersibility, etc., which are required as a black magnetic pigment, and may be produced by various methods. In order to effectively achieve the objects of the present invention, from the standpoint of uniformly performing the subsequent surface treatment, the slurry containing the core particles preferably include none of substances which tend to prohibit the surface treatment, such as, for example, unreacted fine iron hydroxide particles. Also, from the same standpoint, the core particles more preferably have a smooth surface.

As described above, the slurry containing the core particles can be obtained by various methods. For example, by controlling the pH value of a ferrous ($Fe^{2+}$) aqueous solution during an oxidation reaction thereto to a predetermined suitable value, there can be obtained the core particles having an octahedral shape, a polyhedral shape, a spherical shape or an irregular shape. In addition, by suitably adjusting conditions for particle growth during the oxidation reaction, there can be obtained the core particles having a desired particle diameter. Further, the core particles having a well-controlled surface smoothness can be produced by suitably controlling the conditions for particle growth at an end stage of the oxidation reaction or by adding a silicon component or an aluminum component, or compounds which tend to form a spinel ferrite structure such as zinc, magnesium and calcium, to the slurry, as generally known in the art.

As to the ferrous ($Fe^{2+}$) aqueous solution, there may be used, for example, aqueous solutions of ordinary ion compounds such as ferrous sulfate and ferrous chloride. In addition, as the alkali solution which is used for obtaining the iron hydroxide or serves as a pH modifier, there may be used aqueous solutions of sodium hydroxide, sodium carbonate, etc. The respective raw materials may be appropriately selected in view of economy or reaction efficiency.

For example, the spherical core particles may be produced by the following method.

A ferrous sulfate aqueous solution is reacted with an aqueous solution containing sodium hydroxide in an amount of 0.95 equivalent on the basis of $Fe^{2+}$ contained in the ferrous sulfate aqueous solution to obtain a ferrous salt aqueous reaction solution containing a ferrous hydroxide colloid. Then, the thus obtained ferrous salt aqueous reaction solution containing the ferrous hydroxide colloid is subjected to oxidation reaction at 90° C. by passing an oxygen-containing gas therethrough, thereby producing magnetite particles. Next, the slurry containing the thus obtained magnetite particles is mixed with a sodium hydroxide aqueous solution in an amount of 1 equivalent or more on the basis of residual $Fe^{2+}$ contained in the slurry, and the resultant slurry is successively subjected to oxidation reaction to obtain the core particles.

In the below mentioned surface treatment, when Ca, Sr and Ba are used as the alkali earth metal elements, the slurry containing the core particles preferably contains a less amount of a component which tends to form a hardly water-soluble salt, such as a sulfate group ($SO_4^{2-}$).

The slurry containing the core particles preferably has a pH value of not less than 10 and preferably not less than 11. When the pH value of the slurry is less than 10, when adding the Al component to the slurry containing the core particles, aluminum hydroxide tends to be produced simultaneously with the addition of the Al component, so that it may be difficult to form a uniform layer on the surface of the respective core particles.

The slurry containing the core particles is preferably maintained at a temperature of 60 to 95° C. When the temperature of the slurry is less than 60° C., it may be difficult to form a uniform layer comprising the Al component and the alkali earth metal component on the surface of the respective core particles. The upper limit of the temperature of the slurry containing the core particles is not particularly limited. However, since the slurry is in the form of an aqueous slurry, the upper limit of the temperature of the slurry containing the core particles is about 95° C. in view of a good productivity and low costs.

The amount of the Al compound added to the slurry containing the core particles may be controlled depending upon the amount of the core particles contained in the slurry such that the Al content in the finally obtained surface-treated particles is not less than 1000 ppm and not more than 20000 ppm. When the amount of the Al compound added to the slurry containing the core particles is less than 1000 ppm as the Al content in the surface-treated particles, the resultant black magnetic iron oxide particles may fail to exhibit a high electric resistance value as aimed by the present invention. When the amount of the Al compound added to the slurry containing the core particles is more than 20000 ppm as the Al content in the surface-treated particles, the resultant black magnetic iron oxide particles tend to have a high moisture absorption, resulting in low electric resistance value thereof.

The amount of the alkali earth metal compound added to the slurry containing the core particles may also be controlled depending upon the amount of the core particles contained in the slurry such that the alkali earth metal element content in the finally obtained surface-treated particles is not less than 100 ppm and not more than 2000 ppm. When the amount of the alkali earth metal compound added to the slurry containing the core particles is less than 100 ppm as the alkali earth metal content in the surface-treated particles, the resultant black magnetic iron oxide particles may fail to exhibit a high electric resistance value as aimed by the present invention. When the amount of the alkali earth metal compound added to the slurry containing the core particles is more than 2000 ppm as the alkali earth metal content in the surface-treated particles, the resultant black magnetic iron oxide particles tend to have a high moisture absorption, resulting in low electric resistance value thereof.

The order of addition of an aqueous solution containing the Al component and an aqueous solution containing the alkali earth metal component to the slurry containing the core particles is not particularly limited. These aqueous solutions may be added to the slurry separately from each other, or both the aqueous solutions may be previously mixed with each other to form a mixed aqueous solution, followed by adding the mixed aqueous solution to the slurry.

The pH value of the slurry obtained after adding the Al compound and the alkali earth metal salt to the slurry containing the core particles is preferably controlled to 4 to 10 and more preferably 5 to 8. Upon controlling the pH value of the slurry, the slurry and the mixed solution are preferably intimately stirred with each other. In the pH control procedure, the pH value of the slurry of the core particles containing the aqueous solutions of the Al compound and the alkali earth metal salt which slurry has a pH value of not less than 10, is preferably gradually reduced to the aimed value. More specifically, an acid aqueous solution is added to the slurry to once reduce the pH value thereof to 8 to 10, and the resultant slurry is uniformly mixed for not less than 5 min. Then, an acid aqueous solution is added again to the slurry to gradually reduce the pH value and allow the pH value to finally reach 6.5 to 7.5. When the finally obtained slurry has a pH value of less than 4, it may be difficult to form a uniform Al compound containing layer on the surface of the respective core particles. When the finally obtained slurry has a pH value of more than 10, it may be difficult to produce the Al compound.

After adding the Al compound and the alkali earth metal salt to the slurry, the temperature of the slurry is preferably controlled to 60 to 95° C. When the temperature of the slurry is less than 60° C., it may be difficult to form a uniform layer comprising the Al component and the alkali earth metal component on the surface of the respective core particles. The upper limit of the temperature of the slurry is not particularly limited. Since the slurry is in the form of aqueous slurry, the upper limit of the temperature of the slurry is about 95° C. in view of a good productivity and low costs.

After the reaction, the resultant particles may be subjected to water-washing and drying by ordinary methods.

In the black magnetic iron oxide particles of the present invention, it is important that the Al compound is present together with the alkali earth metal component on an outside of the core particles (as the surface layer). In addition, the Al component present on the surface of the core particles may be derived from residual Al remaining in the reaction system after charging a whole Al component at one time during the oxidation reaction for producing the black magnetic iron oxide particles and incorporating a part of the Al component into the core particles. However, even in this case, it is essential that the Al component is present together with the alkali earth metal component on the surface of the core particles. In fact, it was confirmed that the particles obtained by adding an Al component to magnetite particles produced in order to surface-treat the magnetite particles with the Al component as already reported by the present inventors (Japanese Patent No. 3259744) or the particles obtained by surface-treating the Al-doped magnetite particles with the Al component solely as described in the below-mentioned Comparative Examples, have failed to be improved in electric properties. The reason therefor is considered by the present inventors as follows, though it is not clearly determined. That is, it is suggested that the Al component and the alkali earth metal component which are present on the surface of the core particles are reacted with each other to produce a compound thereof, thereby forming an insulating layer made of a hydroxide phase or an oxide hydroxide phase in the form of a uniform film covering the surface of the core particles without any clearances or voids.

The black magnetic iron oxide particles of the present invention can achieve a high image density, in particular, when used as a pigment for a toner, and can exhibit a high electric resistance value in a high voltage range and are, therefore, suitably used especially in the applications having the purpose of attaining a high image density under high-temperature and high-humidity conditions.

EXAMPLES

The present invention is described in more detail by the following Production Examples, Examples and Comparative Examples. However, the following Examples are only illustrative and not intended to limit the scope of the present invention thereto. The methods for measuring and evaluating various properties as well as the methods for producing samples for the evaluation are as follows.

<Average Particle Diameter of Black Magnetic Iron Oxide Particles>

The average particle diameter of the black magnetic iron oxide particles is expressed by an average value of Martin diameters of 800 or more particles observed in a field of view photographed by a transmission electron microscope "JEM-1200EX" manufactured by JEOL, Ltd., which were measured by processing the TEM image using an image processing system.

<Shape of Black Magnetic Iron Oxide Particles>

The shape of the black magnetic iron oxide particles was determined from micrographs obtained by observing particles using the transmission electron microscope and a scanning electron microscope "S-4800" manufactured by Hitachi High-Technologies Corporation.

<BET Specific Surface Area>

The BET specific surface area value of the black magnetic iron oxide particles was measured by a BET method using "Mono Sorb MS-II" manufactured by Yuasa Ionics Co., Ltd.

<Amounts of Alkali Earth Metal Elements and Al Element Contained in Black Magnetic Iron Oxide Particles>

The amounts of alkali earth metal elements (Mg, Ca, Sr and Ba) and Al element contained in the black magnetic iron oxide particles were measured by a "Fluorescent X-ray Analyzer RIX-2100" manufactured by Rigaku Denki Kogyo Co., Ltd., and expressed by the values (calculated as Mg, Ca, Sr and Ba and Al) on the basis of the weight of the black magnetic iron oxide particles.

<Amount of Weak Acid-soluble Al Contained in Black Magnetic Iron Oxide Particles>

The amount of weak acid-soluble Al contained in the black magnetic iron oxide particles was quantitatively determined by mixing particles to be measured in a 0.002 N HCl aqueous solution at 40° C. under stirring for 10 min, subjecting the resultant mixture to filtration to separate a filtrate therefrom, and then measuring an amount of Al element contained in the filtrate using an inductively coupled plasma atomic emission spectrometer (ICP) "SPS-4000 Model" manufactured by Seiko Instruments Inc.

More specifically, 8 g of the black magnetic iron oxide particles were added to water and sufficiently stirred therewith to obtain a slurry. While allowing the obtained slurry to stand at 40° C., a hydrochloric acid aqueous solution was added thereto to prepare a slurry having a HCl concentration of 0.002 N and a total volume of 800 mL. After stirring for 10 min, the slurry was sampled and passed through a membrane filter having a pore size of 0.1 µm to separate a filtrate therefrom. The obtained filtrate was subjected ICP spectroscopic analysis to quantitatively determine the amount of Al contained in the particles. The 10 min-stirring of the slurry was initiated at the time (0 min) at which the HCl solution was added to the slurry. Also, the quantitative determination of Al was stabilized with a good reproducibility by intimately deaggregating the water slurry before adding the HCl solution thereto using a homogenizer, etc.

<Electric Resistance of Black Magnetic Iron Oxide Particles>

The electric resistance value of the black magnetic iron oxide particles upon applying a voltage of 15 V thereto was determined by the following method. That is, 0.5 g of the particles to be measured were weighed, and pressure-molded for 10 seconds using a KBr tableting machine manufactured by Shimadzu Corporation, under a gauge pressure of 14 MPa as a read value on a hand press "SSP-10 Model" manufactured by Shimadzu Corporation, to obtain a molded product having a density of about 2.7 g/cm$^3$. If the other molding apparatus was used for the above procedure, the molding conditions thereof were appropriately controlled so as to obtain a molded product having a density of around 2.7 g/cm$^3$. Next, the thus pressure-molded product as a sample was set between stainless steel electrodes. In this case, the space between the electrodes was completely isolated from an outside by a fluororesin holder. Then, a voltage of 15 V was applied to the sample set between the electrodes using a Wheatstone bridge "Type 2768 Model" manufactured by Yokogawa Denki Co., Ltd., to measure an electric resistance R thereof. When the electric resistance value of the sample was too high and therefore unmeasurable by the Wheatstone bridge, a D.C. voltage of 15 V or a constant voltage of 500 V was applied to the same pressure-molded product using a "High Resistance Meter 4339B" manufactured by Hewlett Packard Inc., to measure the electric resistance R ($\Omega$) as well as an electrode area A (cm$^2$) and a thickness (t) of the sample, and calculate a volume resistivity X ($\Omega$cm) thereof according to the following formula:

$X=R/(A/t)$.

The thus calculated volume resistivity X ($\Omega$cm) was determined as an electric resistance value of the sample.

<Breakdown Voltage of Black Magnetic Iron Oxide Particles>

Using the same electric resistance measuring apparatus as used above, a voltage of 10 V was applied to a molded product formed from 2.0 g of the particles to be measured, to measure an electric resistance value thereof. Thereafter, the voltage applied to the molded product was increased at intervals of 10 V to measure an electric current flowed through the sample at each voltage. The voltage-applying time was within 20 sec for each voltage. When the applied voltage was increased and reached a certain value, the sample suffered from dielectric breakdown so that the electric current flowed therethrough became remarkably high and unmeasurable. The voltage E (V) at which the electric current flowed through the sample was unmeasurable was measured, and the measured value was divided by the thickness of the sample to determine a breakdown voltage (V/cm) of the sample.

Example 1

<Method for Producing a Slurry Containing Core Particles>

23.75 L of a ferrous sulfate aqueous solution containing 1.6 mol/L of Fe$^{2+}$ was added to a reactor previously filled with 26.25 L of an aqueous solution containing 2.75 mol/L of sodium hydroxide (corresponding to 0.95 equivalent based on Fe$^{2+}$). While maintaining the obtained mixed solution at a pH value of 6.5 to 7.5 and a temperature of 90° C., air was passed through the solution at a flow rate of 80 L/min to conduct an oxidation reaction thereof (first stage reaction). At the time at which the oxidation-reduction potential was raised (0.05 equivalent of Fe$^{2+}$ still remained in the solution), 1.25 L of a ferrous sulfate aqueous solution containing 1.6 mol/L of Fe$^{2+}$ was added to the reaction solution, and then a sodium hydroxide aqueous solution was further added to the reactor to oxidize residual Fe$^{2+}$ (3.9 mol) still remaining therein. Thus, after adjusting the pH value of the slurry in the reactor to 10 to 12, the slurry was successively subjected to oxidation reaction (second stage reaction) to complete the oxidation reaction of the slurry, thereby obtaining a slurry containing the core particles.

The thus obtained core particles were sampled, and subjected to filtration, washing with water and then drying by ordinary methods. As a result of observing a micrograph of the thus obtained core particles, it was confirmed that the core particles had a spherical shape.

<Method for Surface-treatment of Core Particles>

The slurry containing the thus obtained core particles and having a pH value of not less than 10 was mixed with 0.5 L of an aqueous solution containing 2.30 mol/L of aluminum sulfate (corresponding to 10340 ppm based on the total amount of the particles). The resultant mixture was stirred at a temperature of 75 to 85° C. and then mixed with 0.05 L of an aqueous solution containing 1.23 mol/L of magnesium sulfate (corresponding to 498 ppm based on the total amount of the particles). The obtained mixture was uniformly mixed for at least 10 min, and then mixed with an acid aqueous solution to once adjust the pH value thereof to 8 to 10, followed by uniformly mixing the mixture for not less than 5 min. The thus obtained mixture was mixed again with an acid aqueous solution to gradually reduce the pH value thereof and finally reduce the pH value to 6.5 to 7.5. The thus obtained slurry was subjected to water-washing, filtration and then drying, thereby obtaining black magnetic iron oxide particles made of magnetite.

Examples 2 to 11 and Comparative Examples 1 to 10

The same procedure as defined in Example 1 was conducted except that the conditions for production of the black magnetic particles were changed variously, thereby obtaining black magnetic iron oxide particles.

Production conditions of the core particles are shown in Table 1, and various properties of the obtained core particles are shown in Table 2. Further, production conditions of the black magnetic iron oxide particles are shown in Table 3, and various properties of the obtained black magnetic iron oxide particles are shown in Table 4.

Meanwhile, as shown in Table 2, the electric resistance values of all of the core particles 1 to 6 already exceeded the measurement limit when the voltage applied thereto reached 500 V. Therefore, the electric resistance values were unmeasurable.

Also, the Al amounts being present on the surface of the core particles obtained in Examples 8 and 9 and Comparative Example 2 as shown in Table 4 are values calculated by subtracting the Al amounts contained in the core particles from the Al amounts contained in the finally obtained surface-treated products.

TABLE 1

| | First stage reaction Fe compound | | |
|---|---|---|---|
| | Kind | Concentration (mol/L) | Amount (L) |
| Core particles 1 | Ferrous sulfate | 1.6 | 23.75 |
| Core particles 2 | Ferrous sulfate | 1.6 | 23.75 |
| Core particles 3 | Ferrous sulfate | 1.6 | 23.75 |
| Core particles 4 | Ferrous sulfate | 1.6 | 23.75 |
| Core particles 5 | Ferrous sulfate | 1.6 | 25 |
| Core particles 6 | Ferrous sulfate | 1.6 | 25 |

| | First stage reaction Alkali hydroxide | | | |
|---|---|---|---|---|
| | Kind | Concentration (mol/L) | Amount (L) | Equivalent ratio |
| Core particles 1 | NaOH | 2.75 | 26.25 | 0.95 |
| Core particles 2 | NaOH | 2.75 | 26.25 | 0.95 |
| Core particles 3 | NaOH | 2.75 | 26.25 | 0.95 |
| Core particles 4 | NaOH | 2.75 | 26.25 | 0.95 |
| Core particles 5 | NaOH | 3.04 | 25 | 0.95 |
| Core particles 6 | NaOH | 3.52 | 25 | 1.10 |

| | First stage reaction | | | |
|---|---|---|---|---|
| | Compounds added | | | Oxidation reaction |
| | Kind | Concentration | Amount | pH |
| Core particles 1 | None | | | 6.7 |
| Core particles 2 | Water glass (SiO$_2$) | 28.8 wt % | 53.61 g | 6.8 |
| Core particles 3 | Zinc sulfate | 0.787 mol/L | 0.3 L | 6.6 |
| Core particles 4 | Aluminum sulfate | 1.2 mol/L | 500 mL | 6.6 |
| Core particles 5 | None | | | 6.7 |
| Core particles 6 | None | | | 11.3 |

| | Second stage reaction Compounds added (Fe element component) | | |
|---|---|---|---|
| | Kind | Concentration (mol/L) | Amount (L) |
| Core particles 1 | Ferrous sulfate | 1.6 | 1.25 |
| Core particles 2 | Ferrous sulfate | 1.6 | 1.25 |
| Core particles 3 | Ferrous sulfate | 1.6 | 1.25 |
| Core particles 4 | Ferrous sulfate | 1.6 | 1.25 |
| Core particles 5 | None | | |
| Core particles 6 | None | | |

TABLE 1-continued

| | Second stage reaction | | | |
|---|---|---|---|---|
| | Compounds added | | | Oxidation reaction |
| | Kind | Concentration | Amount | pH |
| Core particles 1 | None | | | 11 |
| Core particles 2 | None | | | 11 |
| Core particles 3 | None | | | 11 |
| Core particles 4 | None | | | 12 |
| Core particles 5 | None | | | 12 |
| Core particles 6 | None | | | |

TABLE 2

| | Properties of core particles | | |
|---|---|---|---|
| | | Element components other than Fe element added | |
| | Shape | Kind | Amount (wt %) |
| Core particles 1 | Spherical | None | |
| Core particles 2 | Spherical | SiO$_2$ | 0.50 |
| Core particles 3 | Spherical | Zn | 0.50 |
| Core particles 4 | Spherical | Al | 0.52 |
| Core particles 5 | Spherical | None | |
| Core particles 6 | Octahedral | None | |

| | Properties of core particles | | | |
|---|---|---|---|---|
| | BET (m$^2$/g) | Average particle diameter (μm) | Electric resistance value upon application of 15 V (Ωcm) | Electric resistance value upon application of 500 V (Ωcm) |
| Core particles 1 | 9.6 | 0.17 | 3 × 10$^5$ | Unmeasurable |
| Core particles 2 | 10.5 | 0.15 | 1 × 10$^5$ | Unmeasurable |
| Core particles 3 | 7.0 | 0.25 | 5 × 10$^6$ | Unmeasurable |
| Core particles 4 | 9.4 | 0.18 | 5 × 10$^5$ | Unmeasurable |
| Core particles 5 | 14.3 | 0.10 | 1 × 10$^5$ | Unmeasurable |
| Core particles 6 | 8.1 | 0.19 | 2 × 10$^5$ | Unmeasurable |

TABLE 3

| | Slurry containing core particles | |
|---|---|---|
| Examples | Kind of core particles | Concentration of slurry (g/L) |
| Example 1 | Core particles 1 | 75 |
| Example 2 | Core particles 1 | 75 |
| Example 3 | Core particles 1 | 75 |
| Example 4 | Core particles 1 | 75 |
| Example 5 | Core particles 2 | 60 |
| Example 6 | Core particles 2 | 60 |
| Example 7 | Core particles 3 | 75 |
| Example 8 | Core particles 4 | 75 |
| Example 9 | Core particles 4 | 50 |
| Example 10 | Core particles 5 | 30 |
| Example 11 | Core particles 6 | 30 |

TABLE 3-continued

| Examples | Slurry containing core particles | | |
|---|---|---|---|
| | Amount of slurry (L) | Temperature (° C.) | pH |
| Example 1 | 40 | 85 | 11 |
| Example 2 | 40 | 80 | 11 |
| Example 3 | 40 | 75 | 11 |
| Example 4 | 40 | 75 | 11 |
| Example 5 | 50 | 80 | 11 |
| Example 6 | 50 | 80 | 12 |
| Example 7 | 40 | 80 | 11 |
| Example 8 | 40 | 80 | 11 |
| Example 9 | 60 | 80 | 12 |
| Example 10 | 100 | 80 | 11 |
| Example 11 | 100 | 80 | 11 |

| Examples | Al element component | | |
|---|---|---|---|
| | Kind | Concentration (mol/L) | Amount (L) |
| Example 1 | Aluminum sulfate | 2.30 | 0.5 |
| Example 2 | Aluminum sulfate | 2.22 | 1.0 |
| Example 3 | Aluminum sulfate | 0.23 | 1.0 |
| Example 4 | Sodium aluminate | 0.23 | 0.5 |
| Example 5 | Sodium aluminate | 1.11 | 0.5 |
| Example 6 | Sodium aluminate | 1.11 | 0.5 |
| Example 7 | Sodium aluminate | 1.11 | 0.5 |
| Example 8 | Aluminum sulfate | 0.23 | 1.0 |
| Example 9 | Aluminum sulfate | 1.11 | 0.5 |
| Example 10 | Aluminum sulfate | 1.11 | 0.5 |
| Example 11 | Aluminum sulfate | 2.22 | 0.5 |

| Examples | Alkali earth metal element component | | |
|---|---|---|---|
| | Kind | Concentration (mol/L) | Amount (L) |
| Example 1 | Magnesium sulfate | 1.23 | 0.05 |
| Example 2 | Magnesium sulfate | 1.23 | 0.10 |
| Example 3 | Magnesium sulfate | 1.23 | 0.10 |
| Example 4 | Calcium acetate | 0.56 | 0.10 |
| Example 5 | Barium chloride | 0.16 | 0.10 |
| Example 6 | Strontium chloride | 0.26 | 0.10 |
| Example 7 | Magnesium sulfate | 1.23 | 0.10 |
| Example 8 | Magnesium sulfate | 1.23 | 0.10 |
| Example 9 | Magnesium sulfate | 1.23 | 0.15 |
| Example 10 | Magnesium sulfate | 0.12 | 0.12 |
| Example 11 | Magnesium sulfate | 0.12 | 0.15 |

| Comparative Examples | Slurry containing core particles | |
|---|---|---|
| | Kind of core particles | Concentration of slurry (g/L) |
| Comparative Example 1 | Core particles 1 | 75 |
| Comparative Example 2 | Core particles 4 | 75 |
| Comparative Example 3 | Core particles 1 | 75 |
| Comparative Example 4 | Core particles 1 | 75 |
| Comparative Example 5 | Core particles 1 | 75 |
| Comparative Example 6 | Core particles 1 | 75 |
| Comparative Example 7 | Core particles 1 | 60 |
| Comparative Example 8 | Core particles 1 | 60 |
| Comparative Example 9 | Core particles 1 | 50 |
| Comparative Example 10 | Core particles 3 | *1 |

| Comparative Examples | Slurry containing core particles | | |
|---|---|---|---|
| | Amount of Slurry (L) | Temperature (° C.) | pH |
| Comparative Example 1 | 40 | 80 | 11 |
| Comparative Example 2 | 40 | 80 | 11 |
| Comparative Example 3 | 40 | 80 | 12 |
| Comparative Example 4 | 40 | 75 | 11 |
| Comparative Example 5 | 40 | 75 | 5 |
| Comparative Example 6 | 40 | 75 | 12 |
| Comparative Example 7 | 50 | 85 | 12 |
| Comparative Example 8 | 50 | 50 | 5 |
| Comparative Example 9 | 60 | 30 | 11 |
| Comparative Example 10 | *1 | | |

| Comparative Examples | Al element component | | |
|---|---|---|---|
| | Kind | Concentration (mol/L) | Amount (L) |
| Comparative Example 1 | Aluminum sulfate | 0.22 | 1.0 |
| Comparative Example 2 | Aluminum sulfate | 1.83 | 0.2 |
| Comparative Example 3 | None | | |
| Comparative Example 4 | Aluminum sulfate | 0.22 | 1.0 |
| Comparative Example 5 | Aluminum sulfate | 0.22 | 1.0 |
| Comparative Example 6 | Aluminum sulfate | 2.22 | 2.5 |
| Comparative Example 7 | Aluminum sulfate | 0.22 | 0.1 |
| Comparative Example 8 | Aluminum sulfate | 0.22 | 0.4 |
| Comparative Example 9 | Aluminum sulfate | 0.22 | 1.0 |
| Comparative Example 10 | *1 | | |

| Comparative Examples | Alkali earth metal element component | | |
|---|---|---|---|
| | Kind | Concentration (mol/L) | Amount (L) |
| Comparative Example 1 | None | | |
| Comparative Example 2 | None | | |
| Comparative Example 3 | Magnesium sulfate | 1.23 | 0.05 |
| Comparative Example 4 | Magnesium sulfate | 1.23 | 0.50 |
| Comparative Example 5 | Magnesium sulfate | 0.12 | 0.01 |
| Comparative Example 6 | Magnesium sulfate | 0.46 | 0.20 |
| Comparative Example 7 | Magnesium sulfate | 0.12 | 0.10 |

TABLE 3-continued

| | | | |
|---|---|---|---|
| Comparative Example 8 | Magnesium sulfate | 1.23 | 0.05 |
| Comparative Example 9 | Magnesium sulfate | 0.12 | 0.10 |
| Comparative Example 10 | *1 | | |

Note:
*1: Obtained by subjecting the surface-treated product produced in Comparative Example 1 to water-washing and drying and then to pressure-molding.

TABLE 4

| Examples | Shape | Average particle diameter (μm) | BET ($m^2/g$) | Product α (BET × particle diameter) ($m^2/g \cdot \mu m$) |
|---|---|---|---|---|
| Example 1 | Spherical | 0.17 | 9.6 | 1.6 |
| Example 2 | Spherical | 0.17 | 9.8 | 1.7 |
| Example 3 | Spherical | 0.17 | 9.7 | 1.6 |
| Example 4 | Spherical | 0.17 | 9.6 | 1.6 |
| Example 5 | Spherical | 0.15 | 10.7 | 1.6 |
| Example 6 | Spherical | 0.15 | 10.7 | 1.6 |
| Example 7 | Spherical | 0.25 | 7.2 | 1.8 |
| Example 8 | Spherical | 0.18 | 9.5 | 1.7 |
| Example 9 | Spherical | 0.18 | 9.5 | 1.7 |
| Example 10 | Spherical | 0.10 | 14.5 | 1.5 |
| Example 11 | Octahedral | 0.19 | 8.3 | 1.6 |

| Examples | Content of Al (A) (ppm) | Content of alkali earth metal element (B) (ppm) | A/B | Amount of weak acid-soluble Al (ppm) |
|---|---|---|---|---|
| Example 1 | 10320 | 493 | 20.9 | 200 |
| Example 2 | 19900 | 986 | 20.2 | 350 |
| Example 3 | 2000 | 985 | 2.0 | 300 |
| Example 4 | 1001 | 450 | 2.2 | 200 |
| Example 5 | 4980 | 125 | 39.8 | 320 |
| Example 6 | 4975 | 201 | 24.8 | 320 |
| Example 7 | 4984 | 992 | 5.0 | 320 |
| Example 8 | 2060 | 991 | 2.1 | 330 |
| Example 9 | 4985 | 788 | 6.3 | 340 |
| Example 10 | 4978 | 105 | 47.4 | 310 |
| Example 11 | 9958 | 141 | 70.6 | 340 |

| Examples | Electric resistance value upon application of 15 V (Ωcm) | Electric resistance value upon application of 500 V (Ωcm) | Breakdown voltage (V/cm) |
|---|---|---|---|
| Example 1 | $3 \times 10^8$ | $2 \times 10^8$ | 1339 |
| Example 2 | $6 \times 10^8$ | $4 \times 10^8$ | 1571 |
| Example 3 | $1 \times 10^8$ | $1 \times 10^8$ | 1125 |
| Example 4 | $8 \times 10^7$ | $6 \times 10^7$ | 929 |
| Example 5 | $5 \times 10^8$ | $4 \times 10^7$ | 857 |
| Example 6 | $5 \times 10^8$ | $6 \times 10^7$ | 1161 |
| Example 7 | $5 \times 10^8$ | $4 \times 10^8$ | 1321 |
| Example 8 | $2 \times 10^8$ | $1 \times 10^8$ | 1018 |
| Example 9 | $3 \times 10^8$ | $2 \times 10^8$ | 1286 |
| Example 10 | $1 \times 10^8$ | $4 \times 10^8$ | 464 |
| Example 11 | $2 \times 10^7$ | $8 \times 10^8$ | 679 |

| Comparative Examples | Shape | Average particle diameter (μm) | BET ($m^2/g$) | Product α (BET × particle diameter) ($m^2/g \cdot \mu m$) |
|---|---|---|---|---|
| Comparative Example 1 | Spherical | 0.17 | 10.0 | 1.7 |
| Comparative Example 2 | Spherical | 0.17 | 10.1 | 1.7 |
| Comparative Example 3 | Spherical | 0.17 | 10.3 | 1.8 |
| Comparative Example 4 | Spherical | 0.17 | 10.3 | 1.8 |
| Comparative Example 5 | Spherical | 0.17 | 10.2 | 1.7 |
| Comparative Example 6 | Spherical | 0.17 | 42.2 | 7.2 |
| Comparative Example 7 | Spherical | 0.17 | 9.8 | 1.7 |
| Comparative Example 8 | Spherical | 0.17 | 36.3 | 6.2 |
| Comparative Example 9 | Spherical | 0.17 | 35.2 | 6.0 |
| Comparative Example 10 | Spherical | 0.25 | 9.8 | 2.5 |

| Comparative Examples | Content of Al (A) (ppm) | Content of alkali earth metal element (B) (ppm) | A/B | Amount of weak acid-soluble Al (ppm) |
|---|---|---|---|---|
| Comparative Example 1 | 1960 | 0 | — | 510 |
| Comparative Example 2 | 3285 | 0 | — | 380 |
| Comparative Example 3 | 0 | 488 | — | 0 |
| Comparative Example 4 | 1968 | 4973 | 0.4 | 280 |
| Comparative Example 5 | 1966 | 10 | 196.6 | 580 |
| Comparative Example 6 | 49810 | 741 | 67.2 | 930 |
| Comparative Example 7 | 158 | 91 | 1.7 | 50 |
| Comparative Example 8 | 783 | 490 | 1.6 | 680 |
| Comparative Example 9 | 1969 | 92 | 21.4 | 980 |
| Comparative Example 10 | 1964 | 0 | — | 600 |

| Comparative Examples | Electric resistance value upon application of 15 V (Ωcm) | Electric resistance value upon application of 500 V (Ωcm) | Breakdown voltage (V/cm) |
|---|---|---|---|
| Comparative Example 1 | $1 \times 10^7$ | Unmeasurable | 89 |
| Comparative Example 2 | $4 \times 10^7$ | Unmeasurable | 321 |
| Comparative Example 3 | $2 \times 10^6$ | Unmeasurable | 54 |
| Comparative Example 4 | $1 \times 10^7$ | Unmeasurable | 89 |
| Comparative Example 5 | $1 \times 10^7$ | Unmeasurable | 54 |
| Comparative Example 6 | $2 \times 10^7$ | Unmeasurable | 179 |
| Comparative Example 7 | $1 \times 10^5$ | Unmeasurable | 54 |
| Comparative Example 8 | $2 \times 10^5$ | Unmeasurable | 89 |
| Comparative Example 9 | $1 \times 10^5$ | Unmeasurable | 89 |
| Comparative Example 10 | $1 \times 10^5$ | Unmeasurable | 214 |

As shown in Table 4, as to the black magnetic iron oxide particles obtained in Comparative Examples 1 to 10, the electric resistance values of these particles upon applying a voltage of 500 V thereto were unmeasurable.

The black magnetic iron oxide particles having a high electric resistance value in a high voltage range according to the present invention can be suitably used as a pigment in various applications. The black magnetic iron oxide particles can be suitably used, in particular, for a toner, since the obtained toner can exhibit a high image density even under high-temperature and high-humidity conditions.

What is claimed is:

1. Black magnetic iron oxide particles comprising core particles and a surface layer formed on a surface of the respective core particles, the surface layer consisting of a compound of at least one alkali earth metal element selected from the group consisting of Mg, Ca, Sr and Ba and an aluminum element, in which a content of the at least one alkali earth metal element present in the surface layer is from 100 ppm to 1000 ppm on the basis of a whole weight of the black magnetic iron oxide particles; a content of the aluminum element present in the surface layer is from 1000 ppm to 20000 ppm on the basis of a whole weight of the black magnetic iron oxide particles; a ratio [A/B] of the content [A (ppm)] of the aluminum element to the content [B (ppm)] of the at least one alkali earth metal element present in the surface layer is from 1 to 100; and said black magnetic iron oxide particles have a breakdown voltage of not less than 400 V/cm.

2. Black magnetic iron oxide particles according to claim 1, wherein when the black magnetic iron oxide particles are mixed in a 0.002 N HCl aqueous solution at 40° C. under stirring for 10 min, an amount of weak and soluble aluminum eluted from the black magnetic iron oxide particles is not more than 500 ppm on the basis of a weight of the black magnetic iron oxide particles.

3. A molded product formed from the black magnetic iron oxide particles of claim 1, the molded products having a density of 2.7 g/cm$^3$ and exhibits an electric resistance of not less than $1 \times 10^6$ Ωcm when applying a D.C. voltage of 500 V thereto.

4. Black magnetic iron oxide particles according to claim 1, wherein the black magnetic iron oxide particles have an average particle diameter of 0.10 to 0.30 μm and a BET specific surface area of 4 to 20 m$^2$/g, and a product a of the average particle diameter and the BET specific surface area which is represented by the following formula is from 1.2 to 2.0 (1.2≦α≦2.0), where α=the BET specific surface area (m$^2$/g)×average particle diameter (μm).

5. A molded product having a breakdown voltage of not less than 400 V/cm and formed from the magnetic iron oxide particles of claim 1.

* * * * *